(12) United States Patent
Capello

(10) Patent No.: US 10,136,580 B2
(45) Date of Patent: Nov. 27, 2018

(54) FORWARD SUPPORT ROTATING ASSEMBLY FOR A SNAPPING ROLL OF A SNAPPING UNIT OF A COMBINE HARVESTING MACHINE

(71) Applicant: CAPELLO S.R.L., Cuneo (IT)

(72) Inventor: Andrea Capello, Cuneo (IT)

(73) Assignee: CAPELLO S.R.L., Cuneo (IT)

( * ) Notice: Subject to any disclaimer, the term of this patent is extended or adjusted under 35 U.S.C. 154(b) by 31 days.

(21) Appl. No.: 15/501,244

(22) PCT Filed: Aug. 11, 2015

(86) PCT No.: PCT/IB2015/056116
§ 371 (c)(1),
(2) Date: Feb. 2, 2017

(87) PCT Pub. No.: WO2016/020903
PCT Pub. Date: Feb. 11, 2016

(65) Prior Publication Data
US 2017/0223895 A1   Aug. 10, 2017

(30) Foreign Application Priority Data
Aug. 4, 2014   (IT) .............................. TO2014A0627

(51) Int. Cl.
*A01D 45/02*   (2006.01)

(52) U.S. Cl.
CPC .................................. *A01D 45/025* (2013.01)

(58) Field of Classification Search
CPC ...... A01D 45/025; A01D 57/22; A01D 91/04; A01D 43/081; A01D 45/021; A01B 71/04; F16L 19/10; F16L 19/103; B30B 11/222

USPC ...................................... 56/104, 119; 460/29
See application file for complete search history.

(56) References Cited

U.S. PATENT DOCUMENTS

| | | | | |
|---|---|---|---|---|
| 2,180,594 | A | * 11/1939 | Kuhlman | A01D 45/025 241/DIG. 30 |
| 2,334,945 | A | * 11/1943 | Mitchell | A01D 45/025 56/104 |
| 2,618,113 | A | * 11/1952 | Hyman | A01D 45/025 460/29 |
| 2,708,821 | A | 5/1955 | Heth | |

(Continued)

FOREIGN PATENT DOCUMENTS

| | | | |
|---|---|---|---|
| CN | 202925043 U | 5/2013 | |
| DE | 19811156 A1 * | 9/1999 | ........... A01D 45/025 |

(Continued)

*Primary Examiner* — Arpad Fabian-Kovacs
(74) *Attorney, Agent, or Firm* — Howson & Howson LLP

(57) ABSTRACT

A forward support rotating assembly of a combine harvesting machine is provided that has a frontally open axial seat provided in a snapping roll with an inner circumferential abutment edge, a cylindrical support pin extending axially in the seat and being integral with a support bracket for fixing the assembly to a snapping unit, a sliding element interposed between the support pin and the seat, a labyrinth seal element comprising a cylindrical ferrule, which has a labyrinth cross-section and in which there is defined an inner annular seat, and an annular packing seal received in the annular seat and radially contacting the outer surface of the cylindrical support pin. The labyrinth seal element frontally seals the seat with respect to the outside.

7 Claims, 3 Drawing Sheets

(56) References Cited

U.S. PATENT DOCUMENTS

| | | | | |
|---|---|---|---|---|
| 2,927,414 | A * | 3/1960 | Jones | A01D 45/025 460/29 |
| 3,600,876 | A * | 8/1971 | Tanzer | A01D 45/025 56/104 |
| 3,831,356 | A * | 8/1974 | Maiste | A01D 45/021 56/10.3 |
| 3,938,813 | A | 2/1976 | Forch | |
| 4,049,328 | A | 9/1977 | Ouska et al. | |
| 4,720,965 | A * | 1/1988 | Manor | A01D 43/00 56/502 |
| 7,237,373 | B2 | 7/2007 | Resing et al. | |
| 7,874,134 | B1 * | 1/2011 | Hoffman | A01D 45/023 56/119 |
| 2008/0296895 | A1 * | 12/2008 | Williams | F16L 19/10 285/382.7 |
| 2009/0025353 | A1 * | 1/2009 | Christensen | A01D 45/025 56/94 |
| 2010/0025990 | A1 * | 2/2010 | Williams | F16L 19/10 285/342 |
| 2015/0319926 | A1 * | 11/2015 | Madheswaran | A01D 91/04 56/104 |
| 2015/0319927 | A1 * | 11/2015 | Madheswaran | A01D 57/22 56/105 |

FOREIGN PATENT DOCUMENTS

| | | | |
|---|---|---|---|
| DE | 102009010717 A1 | 9/2010 | |
| EP | 0351395 A1 | 1/1990 | |
| EP | 1502492 A2 | 2/2005 | |
| EP | 2084954 A1 * | 8/2009 | A01D 45/025 |
| FR | 2596484 A1 | 10/1987 | |
| GB | 1015166 A | 12/1965 | |
| GB | 1392775 A | 4/1975 | |
| GB | 2007777 A | 5/1979 | |
| GB | 2255141 A * | 10/1992 | F16J 15/22 |

* cited by examiner

FORWARD SUPPORT ROTATING ASSEMBLY FOR A SNAPPING ROLL OF A SNAPPING UNIT OF A COMBINE HARVESTING MACHINE

TECHNICAL FIELD

The invention relates to a forward support rotating assembly for a snapping roll of a snapping unit of a combine harvesting machine.

PRIOR ART

Combine harvesting machines for cereals are equipped with a head which is arranged in the front part of the machine and includes a set of snapping units. The snapping units are intended for pulling the stalks of the cereal plants downwards, until causing the detachment of the cobs while the machine is moving forward. Each snapping unit comprises a support and motion transmitting unit, to which two counter-rotating snapping rolls are cinematically associated. The support and motion transmitting unit is generally equipped with a motor-reducer, to bring the snapping rolls into rotation. Depending on the applications, the snapping rolls are rotatably supported by the support and motion transmitting unit at their rear ends only, i.e. in cantilevered manner, or they are supported at both ends, i.e. at their front and rear ends.

The snapping rolls comprise a substantially cylindrical body with a tapered, generally frustoconical front end portion, defining a draft region for making the entry of the stalks between the counter-rotating rolls easier. The side surface of each roll is provided with protruding portions, which give rise to the downward-pulling effect on the stalks by cooperating with the protruding portions of the adjacent roll in the same snapping unit. EP 1502492 and U.S. Pat. No. 7,237,373 disclose examples of snapping units equipped with helical side protrusions and with protrusions shaped as longitudinal radial knives, respectively. The radial protrusions and the knives may be rectilinear and extend substantially along a generatrix of the cylindrical body, or they may be elliptical, continuous or interrupted, integrally formed in the roll body or removable in order to allow their replacement.

As mentioned above, the snapping rolls are to be rotatably associated to the support and motion transmitting unit of the snapping unit. At present support rotating assemblies requiring frequent lubrication are used. The need for frequent lubrication of the support assembly constitutes an important drawback. The snapping rolls, indeed, need to be manually lubricated while the machine is stopped, with the consequence of a remarkable waste of time and labor. Modern combine harvesting machines are indeed usually equipped with a plurality of snapping rolls and the step of lubricating the whole head can take remarkable time. In addition, the support assemblies currently used are not particularly reliable and robust and, even when they are subjected to regular maintenance interventions, they often cause a rise in the high energy consumption for rotating them as well as because of overheating, seizing and breaking.

A first object of the invention is therefore to provide a forward support rotating assembly for a snapping roll of a snapping unit of a combine harvesting machine that has more dilated maintenance intervals than prior art assemblies. Another object of the invention is to provide an assembly of the aforementioned kind that requires substantially no maintenance. A further object of the invention is to provide a forward support rotating assembly for a snapping roll of snapping units of combine harvesting machines that is reliable and easy to manufacture. A not least object of the invention is to provide an assembly of the aforementioned kind that can be made industrially and with limited costs and requires lower energy consumption for being brought into rotation.

These and other objects are achieved with the support rotating assembly according to the invention as claimed in the appended claims.

SUMMARY OF THE INVENTION

The forward support rotating assembly for a snapping roll comprises an axial seat provided in the snapping roll. A cylindrical body, preferably solid, defining a support pin of the support assembly is received in the axial seat. The support pin extends axially in the seat of the snapping roll. The seat is frontally open and is provided with an inner circumferential abutment edge provided in a distal position with respect to the front opening of the seat. The abutment edge defines a support base for the components of the support assembly received in the axial seat. At least one sliding element and at least one labyrinth seal element are interposed between the support pin and the inner wall of the seat. The labyrinth seal element frontally closes the seat toward the outside, thus isolating the sliding element from the environment outside the snapping roll.

In addition, an elastic ring for locking the sliding element and an elastic annular seal are preferably also provided. According to a preferred embodiment of the invention, the sliding element comprises a ball bearing. Still according to this embodiment, the locking ring comprises a Seeger ring housed in a radial annular slot formed in the inner wall of the seat. The elastic annular seal is preferably a suitably shaped elastic ring made of a natural or synthetic rubber. The labyrinth seal element comprises a cylindrical gland having a labyrinth cross-section, in which there are defined an inner annular seat and an annular packing seal received in the annular seat and radially contacting the outer surface of the cylindrical support pin. The packing seal is received in the space between the outer surface of the cylindrical body and the inner wall of the seat. The packing seal preferably comprises a fiber, a binder and a lubricant. In an embodiment of the invention, the packing seal comprises an elastic braid made of cotton and full of tallow. In other embodiments of the invention the packing seal is made of a weft of yarns made of a single material or different materials, braids or strands of hemp, soaked with fat in order to ensure tight-sealing and friction resistance thereof. In still other embodiments, the packing seal is made of fibers of teflon (or PTFE), kevlar and graphite. The elastic annular seal comprises a double-lip gasket having a U-shaped cross-section in which there are defined an outer annular portion, an inner annular portion having a double lip extending radially toward the inside, and a transverse connecting portion between the outer portion and the inner portion. The double lip comprises two corresponding elastic flaps radially diverging at an angle comprised between 60° and 120°, preferably at 90°. The cylindrical ferrule has a substantially F-shaped cross-section in which there is defined an outer annular portion and two parallel inner radial portions between which the slot for the packing seal is defined.

BRIEF DESCRIPTION OF THE DRAWINGS

Some preferred embodiments of the invention will be described below by way of non-limiting examples with reference to the annexed figures, in which.

DESCRIPTION OF SOME PREFERRED EMBODIMENTS OF THE INVENTION

Figure 1:
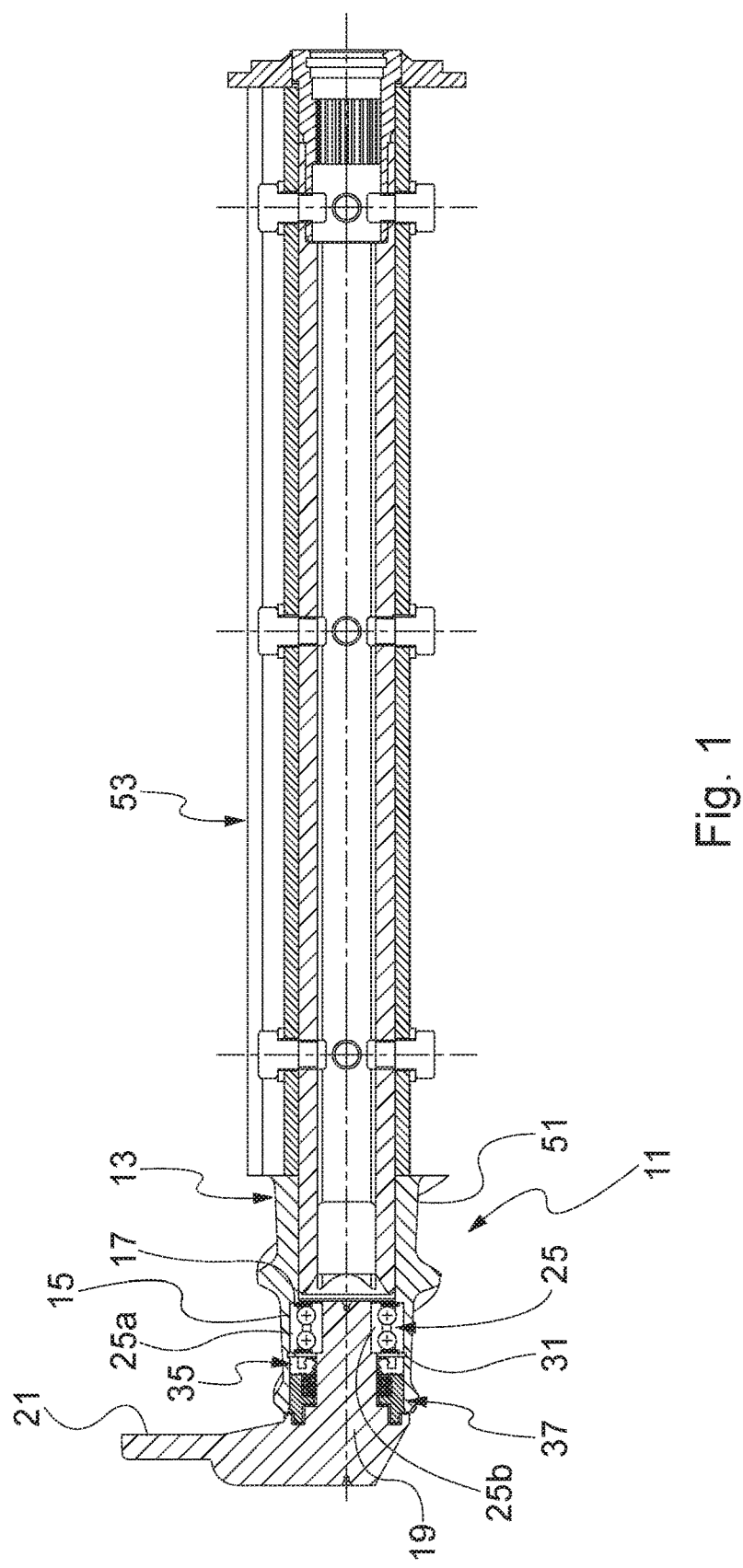
FIG. 1 is a longitudinal section of a snapping roll provided with a forward support rotating assembly according to a preferred embodiment of the invention.
Figure 2:
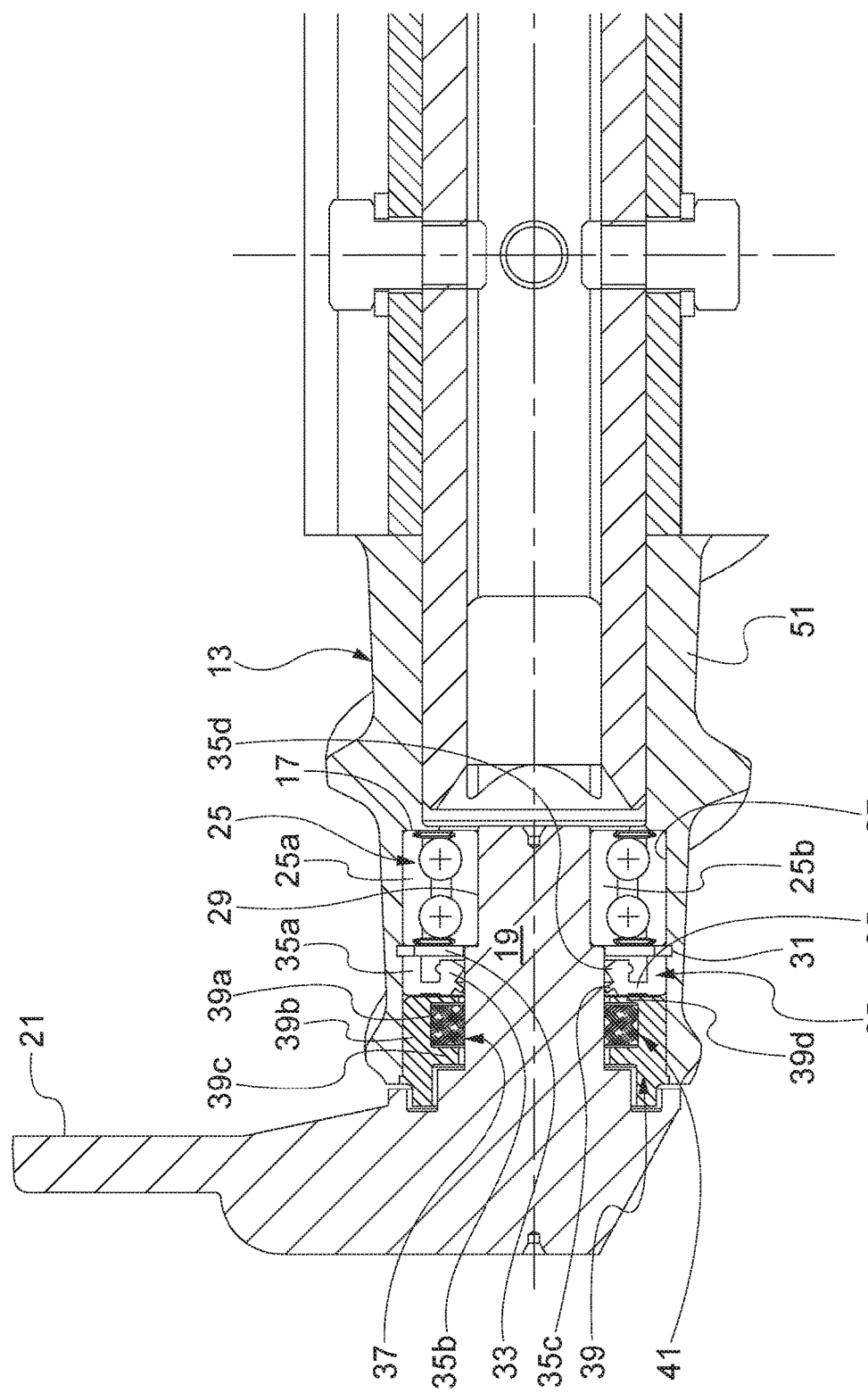
FIG. 2 is an enlarged view of the support assembly of FIG. 1.
Figure 3:
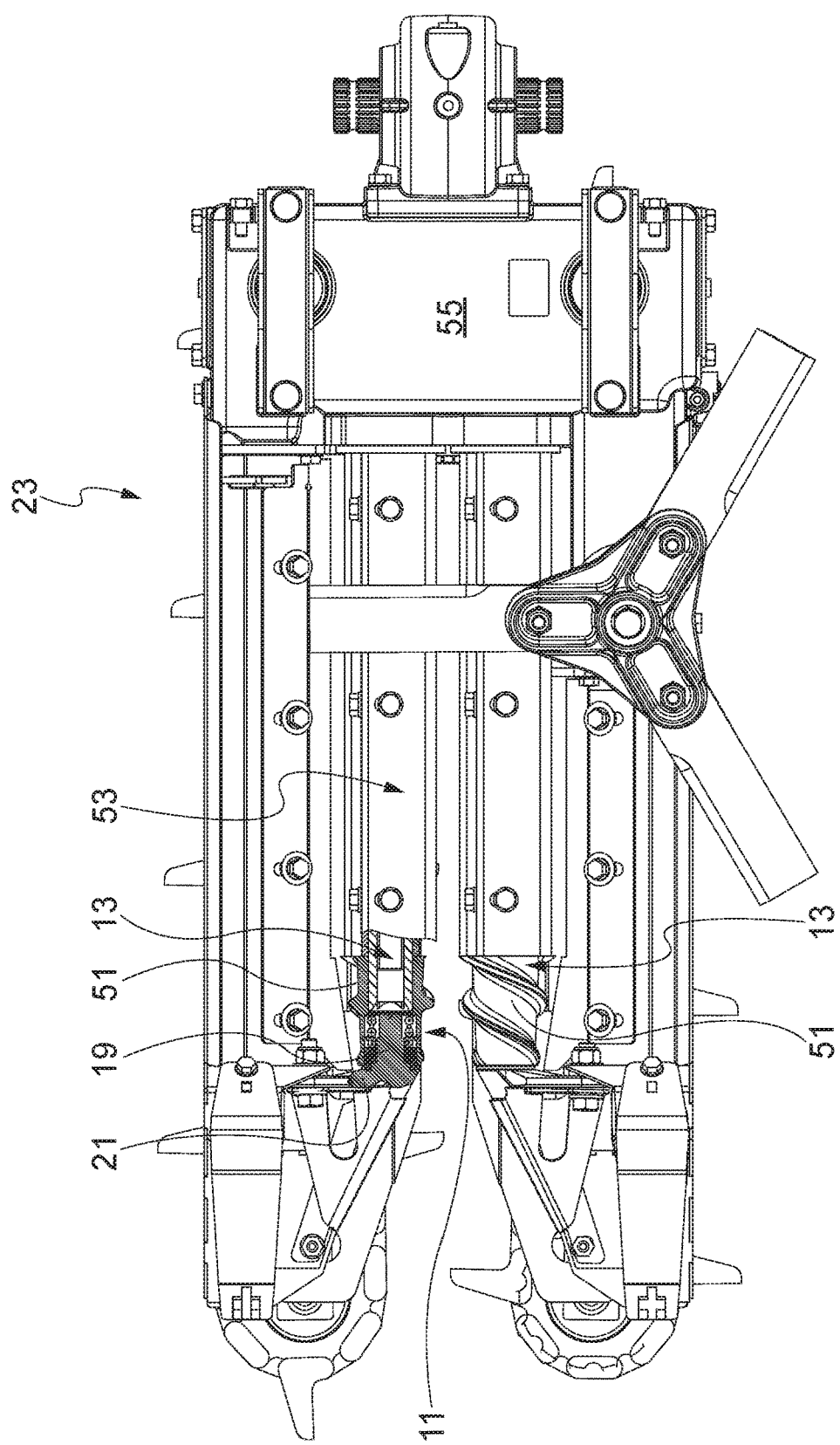
FIG. 3 is a top plan view of a snapping unit equipped with two snapping rolls provided with a support assembly according to FIG. 1.

Referring to FIGS. 1 to 3, the support rotating assembly 11 of a snapping roll 13 comprises an axial seat 15 in the roll 13. The seat 15 is frontally open and has an inner circumferential abutment edge 17. The seat 15 is frontally arranged in the roll 13. The support assembly 11 further comprises a cylindrical support pin 19 extending axially in the seat 15. The pin 19 is integral to a support bracket 21 for fixing the assembly 11 to a snapping unit 23 of a combine harvesting machine. The support assembly 11 comprises a sliding element 25 interposed between the support pin 19 and the seat 15. In the illustrated embodiment, the sliding element 25 is a ball bearing. The outer ring 25a of the bearing 25 is radially in contact with the inner wall 27 of the seat 15. The inner ring 25b of the bearing 25 is radially in contact with the outer wall 29 of the pin 19. The bearing 25 is further axially in contact with the abutment edge 17 of the seat 15. A radial annular slot 31 housing an elastic ring 33 for locking the sliding element 25 is formed in the wall 27. In the illustrated embodiment, the elastic ring 33 consists of a Seeger ring. An elastic annular seal 35 is provided between the support pin 19 and the inner wall 27 of the seat 15. In the illustrated embodiment, the seal 35 consists of a double-lip gasket having a substantially U-shaped cross-section. An outer annular portion 35a, an inner annular portion 35b having a double lip 35c,35d and extending radially toward the inside, and a transverse connecting portion 35e arranged between the outer portion 35a and the inner portion 35b are defined in the seal 35. In the illustrated embodiment, the double lip comprises two corresponding elastic flaps 35c, 35d, radially diverging and forming between them an angle comprised between 60° and 120°, preferably an angle of 90°. The seal 35 is further axially in contact with the elastic ring 33. According to the invention, the support assembly 11 is further provided with a labyrinth seal element 37. The labyrinth seal element 37 comprises a cylindrical ferrule 39 and an annular packing seal 41. The ferrule 39 has a labyrinth cross-section in which an inner annular groove 39a housing the packing seal 41 is defined. The packing seal 41 is radially in contact with the outer surface 29 of the support pin 19. The cylindrical ferrule 39 has a substantially F-shaped cross-section in which there is defined an outer annular portion 39b and two parallel inner radial portions 39c,39d between which the groove 39a for the packing 41 is defined. According to a preferred embodiment of the invention the cylindrical ferrule 39 is made of carbon steel. The packing seal 41 comprises for instance a braid of synthetic yarn impregnated with graphite powder, a corrosion inhibitor and a lubricant. The assembly 11 according to the invention is substantially maintenance-free, i.e. it does not require maintenance interventions, practically for the entire service life of the snapping roll 13. In the shown example, the snapping roll 13 comprises a helical surface 51 at its front end supported by the support assembly 11. The snapping roll 13 extends longitudinally inside a support chamber 53 and is rotated by a support and motion transmitting unit 55. The snapping roll 13 is preferably hollow and further comprises a sealing plug 57 isolating the sliding element 25 from the chamber inside the roll 13, on the side opposite to the labyrinth seal 39. The snapping unit 23 will not be described further as it is part of the prior art known to the person skilled in the art.

INDUSTRIAL APPLICABILITY

The invention is adapted to be applied to the industry of agricultural mechanics, namely to snapping units of either new produced or already existing combine harvesting machines. Indeed, it is advantageously possible to provide with the support rotating assembly also combine machines having conventional support assemblies.

The invention as described and illustrated may undergo several changes and modifications falling within the same inventive principle.

The invention claimed is:

1. A forward support rotating assembly (11) for a snapping roll (13) of a snapping unit (23) of a combine harvesting machine, comprising:
    a frontally open axial seat (15) provided in the snapping roll (13) and having an inner circumferential abutment edge (17);
    a cylindrical support pin (19) extending axially in the seat (15) and being integral with a support bracket (21) for fixing the assembly (11) to a snapping unit (23);
    a sliding element (25) interposed between the support pin (19) and the seat (15);
    an elastic annular seal (35) between the cylindrical support pin (19) and an inner wall (27) of the seat (15), the elastic annular seal (35) being a double-lip gasket having a U-shaped cross-section in which there are defined an outer annular portion (35a), an inner annular portion (35b) having a double lip (35c,35d) and extending radially toward the inside, and a transverse connecting portion (35e) between the outer portion (35a) and the inner portion (35b); and
    a labyrinth seal element (37) comprising a cylindrical ferrule (39), which has a labyrinth cross-section and in which there is defined an inner annular seat (39a), and an annular packing seal (41) received in the annular seat (39a) and radially contacting the outer surface (29) of the cylindrical support pin (19), wherein the labyrinth seal element (37) frontally seals the seat (15) with respect to the outside.

2. The assembly according to claim 1, wherein the sliding element (25) is a ball bearing axially contacting the abutment edge (17).

3. The assembly according to claim 2, comprising an elastic ring (33) adapted for locking the bearing (25) and housed in a radial annular slot (31) formed in the inner wall (27) of the seat (15) and wherein the bearing (25) axially contacts the elastic ring (33).

4. The assembly according to claim 1, wherein the double lip comprises two corresponding elastic flaps (35c,35d) radially diverging at an angle comprised between 60° and 120°.

5. The assembly according to claim 1, wherein the cylindrical ferrule (39) has a substantially F-shaped cross-section in which there is defined an outer annular portion (39b) and two parallel inner radial portions between which the seat (39a) for the packing seal (41) is defined.

6. The assembly according to claim 1, wherein the cylindrical ferrule (39) is made of carbon steel.

7. The assembly according to claim 1, wherein the packing seal (41) comprises a braid of synthetic yarn impregnated with graphite powder, a corrosion inhibitor and a lubricant.

* * * * *